United States Patent Office 3,720,657
Patented Mar. 13, 1973

3,720,657
PROCESS FOR EXTRACTING PANCREAS GLANDS
Jan Willem de Vries, Oss, Netherlands, assignor to
Organon Inc., West Orange, N.J.
No Drawing. Filed Nov. 6, 1969, Ser. No. 874,727
Claims priority, application Netherlands, Nov. 20, 1968,
6816599
Int. Cl. C07c 103/52; A61k 17/04
U.S. Cl. 260—112.7                                    4 Claims

ABSTRACT OF THE DISCLOSURE

The invention relates to a process for extracting insulin from pancreas glands by means of an acidified solvent for insulin and comprises extracting the pancreas with a solvent acidified with sulphuric acid, preferably at a pH between about 2.4 and 5.2, after which hydrochloric acid is added to the extraction mixture preferably till the pH is about 2.0 and the extraction is continued. In this way the amount of protein obtained is on a high level, whereas the extract can be easily separated from the tissue residue to give a clear extract and the precipitate of inactive proteins, formed by adjusting the pH of the extract to about 8, can be filtered in a very short time.

BACKGROUND OF THE INVENTION

For the extraction of pancreas glands for the purpose of obtaining insulin, an acidified aqueous organic solvent, mostly ethanol, is used in the majority of cases. Taking into account the water these glands contain, the alcohol concentration applied usually ranges between 50 and 80% by volume. The pH values are generally between 2 and 5, the period of extraction being about 2 or 3 hours.

As acid both organic and inorganic acids can be used. The former acids mostly have the disadvantage that uneconomically large quantities are required to obtain a low pH, for example, 2. This disadvantage also attaches to less strong inorganic acids. Conventional are: hydrochloric acid, sulphuric acid and phosphoric acid.

Prior to extraction the frozen glands are ground or chopped up and then suspended, while stirring, in about double the volume of acidified, dilute alcohol of such a concentration that the ultimate concentration of the reaction mixture is between 60 and 70% by volume. Then the pH is usually adjusted with a suitable acid at 2 or 3, after which the suspension is stirred at about 10° C. for of from 1 to 3 hours. To separate the extract from the remaining tissue, the mass obtained is centrifuged, whether or not after the addition of a filtering aid, till the extract is as clear as it possibly can be. As this is tantamount to a very long centrifugation period, which is uneconomical, one will put up with a shorter centrifugation period in practice when processing extracts which are very hard to centrifuge. Consequently the acid extract will generally still contain finely divided tissue remains and viscous matter. Therefore there is a need of an extraction method which provides a very clear extract after a short centrifugation period. The centrifuged tissue residue is usually also subjected to a few extra extractions. The extract obtained is adjusted to a pH of 8 or thereabouts with concentrated ammonia to form a voluminous precipitate of inactive proteins and finely divided tissue residue. This precipitate is removed by filtration while adding a filtering aid. There is a tendency to shorten this treatment at the said pH as much as possible, firstly to restrict the action of any remaining enzyme activity which may occur under unfavourable conditions on the extracted insulin, secondly to prevent as much as possible reduction of insulin at this pH by active thiol groups present in the extract and the precipitate.

As the duration of the filtration is determined by the filterability of the precipitate, both the centrifugeability of the extract and the filterability of the pH 8 precipitate, which is influenced by the centrifugeability, manifest themselves in the filtration period.

The clear filtrate obtained is adjusted as quickly as possible to a pH of about 3 and evaporated in vacuo to about ⅕ of its volume. The fat is removed from the residue, whereupon the residue is filtered and the protein contained in it flocculated by adding 28 kg., sodium chloride per 100 l. of filtrate. The thus obtained crude insulin is further purified.

On searching for an improved extraction method which will not cause any difficulties in view of the processing of the pancreas glands, one should not lose sight of the fact that the amount of protein extracted by the new method must not appreciably fall. The fact is that experience has shown that an appreciatable fall in the yield of protein is attended with a fall in the yield of insulin. In this connection applicant tested some acids on their capacity of extracting protein by means of the extraction method described above. Hog pancreas was extracted with 2 volumes 81% ethanol having a final concentration of 60% by volume (extraction period: 90 minutes at 8° C.). The extract was centrifuged at 1000 g. for 10 minutes. After salting out with 28% saline and after that with 10% saline, the total quantities of protein obtained were compared with each other by means of the biuret determination. Table I shows the result of this test.

TABLE I

| Acid added | $H_3PO_4$ | $HClO_4$ | $H_2SO_4$ | $HCl$ |
|---|---|---|---|---|
| pH extraction | 2.8 | 2.0 | 2.0 | 2.0 |
| Volume pH 8 precipitate in percent of crude extract | 24.5 | (¹) | 12.5 | 31.6 |
| Biuret value per kg. of pancreas | 47.17 | | 23.40 | 63.55 |
| Biuret value in percent of HCl-extract | 74 | | 37 | 100 |

¹ Not filterable.

These data show that alcoholic HCl extracts the most protein. However, the volume of the precipitate to be filtered is very large, which requires very long filtration periods. Further it appears that alcoholic $H_2SO_4$ gives an extract that can be processed most easily, but this extracting agent has an insufficient capacity of extracting protein.

SUMMARY OF THE INVENTION

A method has now been found for extracting insulin from pancreas glands by means of an acidified solvent for insulin, characterized in that the pancreas is first extracted for some time in the solvent acidified with sulphuric acid, after which hydrochloric acid is added and the pancreas is extracted further to obtain an extraction mixture which can be centrifuged quite well, while the precipitate formed at a pH of about 8 can be filtered in a very short time. Also, it appears that the amount of protein obtained in this process by extraction is on a level with the yield obtained by extraction with a lower aliphatic alcohol acidified with hydrochloric acid. For insulin ethanol is the preferred organic solvent.

The pancreas glands to be extracted may be from any source, for example from cattle, hogs, whales, and fishes. The desired effect is already noticeable after lowering the pH of the extraction mixture with sulphuric acid to 5.2 and incubation of the mixture for 15 minutes, followed by extraction for 60 minutes after the addition of hydrochloric acid. The filtration period has been reduced to less than one half as compared with that of the extract with hydrochloric acid alone. If one extracts first with hydrochloric acid for 60 minutes and then with sulphuric acid, the total extraction period being otherwise equal, then it is out of the question to expect that the glands will be better processable.

The extraction with sulphuric acid is preferably performed at a pH of between 2.4 and 5.2. If one lowers the extraction pH with sulphuric acid to 3.0, the extraction time being otherwise equal, the filtration time at pH 8 is reduced to ⅕ of that required in the sulphuric acid extraction at pH 5.2.

When comparing the filtration periods of the pH 8 precipitate after extracting, say 100 gm. of hog pancreas with alcoholic $H_2SO_4$ on the one side and alcoholic HCl on the other, the first extraction proves to give very short filtration periods of, for example, 25 and 60 seconds, whereas the second gives filtration periods of about 6 hours.

It has now been found that the duration of the pH 8 filtration after extraction in accordance with the invention can yet be shortened appreciably, and that to the same short periods as those after extraction with sulphuric acid alone, by lengthening the extraction period with sulphuric acid from about 15 to about 30 minutes and longer. Therefore it is preferred to perform the extraction with hydrochloric acid in a period of time of 30 minutes or longer.

Applicant discussed above the filtration of the precipitate obtained by raising the pH of the centrifuged pancreas extract to about 8. In some processes the pH is raised to another value in the range of from about 5 to 9, in which case application of the invention also offers great advantages because the filtration period is greately reduced by the appreciable improvement of the centrifugeability of the acid extraction mixture.

It stands to reason that the residue of the pancreas which has been separated from the extract by centrifugation will be subjected to a second and, possibly, a third extraction. There may be an advantage in performing at least also the second extraction in accordance with the method of the invention. It is a well-known fact that the problems attended with the centrifugation and the filtration of following extracts of the same starting material are not so great as those of the preceding extracts.

In the following examples the invention is illustrated in detail. The tests referred to in these examples were chiefly performed with hog pancreas. Applicant emphasizes the fact that the processing of hog pancreas is usually more difficult than e.g. the processing of cattle pancreas by the conventional extraction methods, i.a. by their higher fat content.

DESCRIPTION OF THE PREFERRED EMBODIMENTS

Example I

Of a quantity of ground and thoroughly homogenized hog pancreas portions of 200 gm. were suspended in 400 ml. 81% by volume ethanol. To the extraction mixture the acid mentioned in the table was added till the pH indicated had been reached. Except in the first test, the pH was reduced to 2 after the said extraction period. During the extraction the temperature was maintained at 10° C. When the mixture had been extracted for 75 minutes in all, 5 gm. filter aid was added. Then the mixture was centrifuged for 10 minutes at about 1000 g. Then the extract was adjusted with ammonia to pH 8 and the filtrate obtained filtered over filtering paper ($\phi$ 9 cm.) by means of 5 gm. filter aid. Then the clear pH-filtrate was adjusted to pH 3 and evaporated to ⅕ of its volume. The fat was removed from the distillation residue and the distillation residue filtered. The protein was precipitated by adding 28% NaCl. The precipitate was filtered, dissolved and precipitated again with 10% NaCl. The precipitate was collected and dissolved. Finally the protein content of the resulting solutions were compared with each other.

TABLE II

| Acid added | pH | Duration extraction in min. | Duration pH 8 filtration in min. | Vol. pH 8 precipitation in percent crude extract | Biuret value Per kg. of pancreas | Biuret value In percent of HCl extract |
|---|---|---|---|---|---|---|
| HCl | 2.0 | 75 | 335 | 36.1 | 69.38 | 100 |
| HCl<br>then $H_2SO_4$ | 2.5<br>2.0 | 60<br>15 | 335 | 33.3 | 68.99 | 99 |
| $H_2SO_4$<br>then HCl | 5.2<br>2.0 | 15<br>60 | 158 | 11.1 | 71.85 | 103 |
| $H_2SO_4$<br>then HCl | 4.3<br>2.0 | 15<br>60 | 152 | 10.9 | 67.93 | 98 |
| $H_2SO_4$<br>then HCl | 3.7<br>2.0 | 15<br>60 | 84 | 10.8 | 62.18 | 90 |
| $H_2SO_4$<br>then HCl | 3.3<br>2.0 | 15<br>60 | 35 | 6.4 | 67.99 | 98 |
| $H_2SO_4$<br>then HCl | 3.0<br>2.0 | 15<br>60 | 33 | 7.7 | 65.03 | 94 |

This example shows clearly the favourable influence of the extraction with sulphuric acid, followed by further extraction with hydrochloric acid, on the centrifugeability of the extract and the duration of the pH 8 filtration. The yield of protein obtained by the process of the invention is on a level with that obtained after extraction with hydrochloric acid.

Example II

In the same manner as indicated in Example I portions of 200 gm. of hog pancreas of the same lot were processed, but these quantities were incubated with sulphuric acid for 30 minutes. Extraction time 105 minutes in all.

TABLE III

| Acid added | pH | Duration extraction in min. | Duration pH 8 filtration in sec. | Vol. pH 8 precipitation in percent crude extract | Biuret value per kg. of pancreas |
|---|---|---|---|---|---|
| $H_2SO_4$ | 2.0 | 105 | 76 | 4.7 | 31.05 |
| $H_2SO_4$<br>then HCl | 2.5<br>2.0 | 30<br>75 | 33 | 4.3 | 41.91 |
| $H_2SO_4$<br>then HCl | 3.0<br>2.0 | 30<br>75 | 76 | 3.7 | 50.81 |
| $H_2SO_4$<br>then HCl | 3.5<br>2.0 | 30<br>75 | 60 | 4.0 | 66.23 |

This example shows that the favourable effect on the centrifugeability of the extraction mixture and the duration of the pH 8 filtration by longer extraction with sulphuric acid is appreciably intensified.

Example III

In the same manner as described in the preceding examples, 5 extractions were performed with 2 quantities of 50 kg. cattle pancreas and with 3 quantities of 50 kg. hog pancreas; the pH during the extraction with sulphuric acid: 2.8, 2.8, 2.5, 2.8 and 3.0 respectively. Extraction period: 30 minutes in each test. Then the pH was lowered with hydrochloric acid to 2.0 and the extraction continued for 1½ hours. The pancreas residue obtained after centrifugation (12 minutes, 900 g.) was extracted twice, viz, with 2.5 and then 1 volume 60% ethanol to which sulphuric acid and then hydrochloric acid was added till the pH had reached the said values. After centrifugation the total extract was ajusted to pH 8 and the resulting precipitate filtered over a press filter of 3 sq. m. In all these cases filtration took place for about 12 minutes, which compared with a 3 hours filtration period of an extract obtained in the same manner with hydrochloric acid alone, may be called an exceptional improvement.

What is claimed is:

1. In the process for extracting insulin from finely divided pancreas glands of mammals with an aqueous organic solvent acidified with an inorganic acid, centrifuging the extraction mixture, raising the pH of the solution to about 8 to precipitate inactive proteins and tissue residue, separating the precipitate, and recovering insulin from the filtrate, the improvement which comprises the steps of:

(a) first extracting said pancreas glands with an aqueous lower aliphatic alcohol which is a solvent for the insulin, in which the lower aliphatic alcohol is present in a concentration between about 60% and about 70% by volume, said aqueous alcohol being acidified with sulfuric acid to a pH between about 2.4 and about 5.2; and (b) without separating the gland residue, adding hydrochloric acid to the extraction mixture to a pH between about 2.0 and a value lower than that in step (a) and continuing the extraction.

2. The process of claim 1 in which the lower aliphatic alcohol is ethanol.

3. The process of claim 1 in which the extraction in step (b) is performed for at least 30 minutes.

4. The process of claim 1 in which the extraction after the addition of hydrochloric acid in step (b) is performed at a pH of 2 for 75 minutes.

References Cited

UNITED STATES PATENTS

| | | | |
|---|---|---|---|
| 2,695,861 | 11/1954 | Maxwell et al. | 260—112.7 |
| 2,115,418 | 4/1938 | Dragstedt et al. | 424—110 |
| 2,779,706 | 1/1957 | Homan | 260—112.7 |
| 2,524,658 | 10/1950 | Frederiksen | 195—62 |

OTHER REFERENCES

Henry, Biochemical Preparations, vol. 8, Meister, ed., John Wiley and Sons, New York (1961), pp. 102–104.

Blatherwich et al., J. Biol. Chem. 72, pp. 57–89 (1927).

ELBERT L. ROBERTS, Primary Examiner